United States Patent
Stibich et al.

(10) Patent No.: US 10,829,159 B2
(45) Date of Patent: Nov. 10, 2020

(54) VEHICLE HAVING REINFORCEMENT ASSEMBLIES

(71) Applicants: Paul R Stibich, Troy, MI (US); David M Biernat, Grosse Pointe Park, MI (US); Radhakrishnan Raman, Troy, MI (US)

(72) Inventors: Paul R Stibich, Troy, MI (US); David M Biernat, Grosse Pointe Park, MI (US); Radhakrishnan Raman, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 149 days.

(21) Appl. No.: 16/134,025

(22) Filed: Sep. 18, 2018

(65) Prior Publication Data

US 2020/0086924 A1    Mar. 19, 2020

(51) Int. Cl.
| | | |
|---|---|---|
| *B62D 25/04* | (2006.01) | |
| *B62D 25/06* | (2006.01) | |
| *B62D 33/02* | (2006.01) | |
| *B62D 29/00* | (2006.01) | |

(52) U.S. Cl.
CPC .............. *B62D 25/04* (2013.01); *B62D 25/06* (2013.01); *B62D 29/005* (2013.01); *B62D 33/02* (2013.01)

(58) Field of Classification Search
CPC ........ B62D 25/04; B62D 25/06; B62D 33/02; B62D 29/002; B62D 29/005
USPC ............................ 296/187.02, 193.06, 183.1
See application file for complete search history.

(56) References Cited

U.S. PATENT DOCUMENTS

| | | | |
|---|---|---|---|
| 5,124,186 A | | 6/1992 | Wycech |
| 6,149,360 A | * | 11/2000 | Billotte .............. B62D 33/0215 |
| | | | 410/32 |
| 6,250,711 B1 | * | 6/2001 | Takahara ................ B60R 21/04 |
| | | | 296/146.6 |
| 6,358,584 B1 | | 3/2002 | Czaplicki |
| 6,715,592 B2 | * | 4/2004 | Suzuki .................... B60R 21/04 |
| | | | 188/371 |
| 6,942,076 B2 | * | 9/2005 | Suzuki .................... B60R 21/04 |
| | | | 188/371 |
| 10,343,727 B1 | * | 7/2019 | Hihara .................... B62D 33/02 |
| 2002/0033617 A1 | * | 3/2002 | Blank .................. B62D 21/157 |
| | | | 296/187.02 |
| 2003/0218019 A1 | * | 11/2003 | Le Gall ................ B62D 29/002 |
| | | | 220/560.12 |
| 2009/0001758 A1 | | 1/2009 | Hanley, IV et al. |
| 2012/0324793 A1 | * | 12/2012 | Abbasi ............... B62D 33/0273 |
| | | | 49/168 |
| 2014/0087126 A1 | * | 3/2014 | Quaderer .................. B32B 3/16 |
| | | | 428/114 |
| 2014/0322493 A1 | * | 10/2014 | Billette ..................... B32B 3/30 |
| | | | 428/172 |
| 2016/0229456 A1 | * | 8/2016 | Boettcher ............ B62D 25/025 |

(Continued)

*Primary Examiner* — Jason S Morrow
(74) *Attorney, Agent, or Firm* — Ralph E Smith

(57) ABSTRACT

A vehicle includes a vehicle body and a reinforcement assembly. The vehicle body has first inner and outer walls that define a cavity and second inner and outer curved walls that define another cavity. The reinforcement assembly includes a plurality of inserts. One insert of the plurality of inserts is at least partially disposed in the cavity defined by the first inner and outer walls and another insert of the plurality of inserts is at least partially disposed in the another cavity defined by the second inner and outer curved walls.

14 Claims, 8 Drawing Sheets

(56) References Cited

U.S. PATENT DOCUMENTS

| | | | | |
|---|---|---|---|---|
| 2016/0229457 A1* | 8/2016 | Boettcher | .............. | B62D 25/04 |
| 2018/0001938 A1* | 1/2018 | Higgins | ................ | B62D 33/02 |
| 2018/0304932 A1* | 10/2018 | Cooper | ................ | B62D 25/025 |
| 2019/0077462 A1* | 3/2019 | Yang | .................... | B62D 25/025 |
| 2019/0144049 A1* | 5/2019 | Belpaire | .............. | B62D 29/005 |
| | | | | 296/187.01 |
| 2019/0233010 A1* | 8/2019 | Ichimaru | .............. | B62D 27/023 |

* cited by examiner

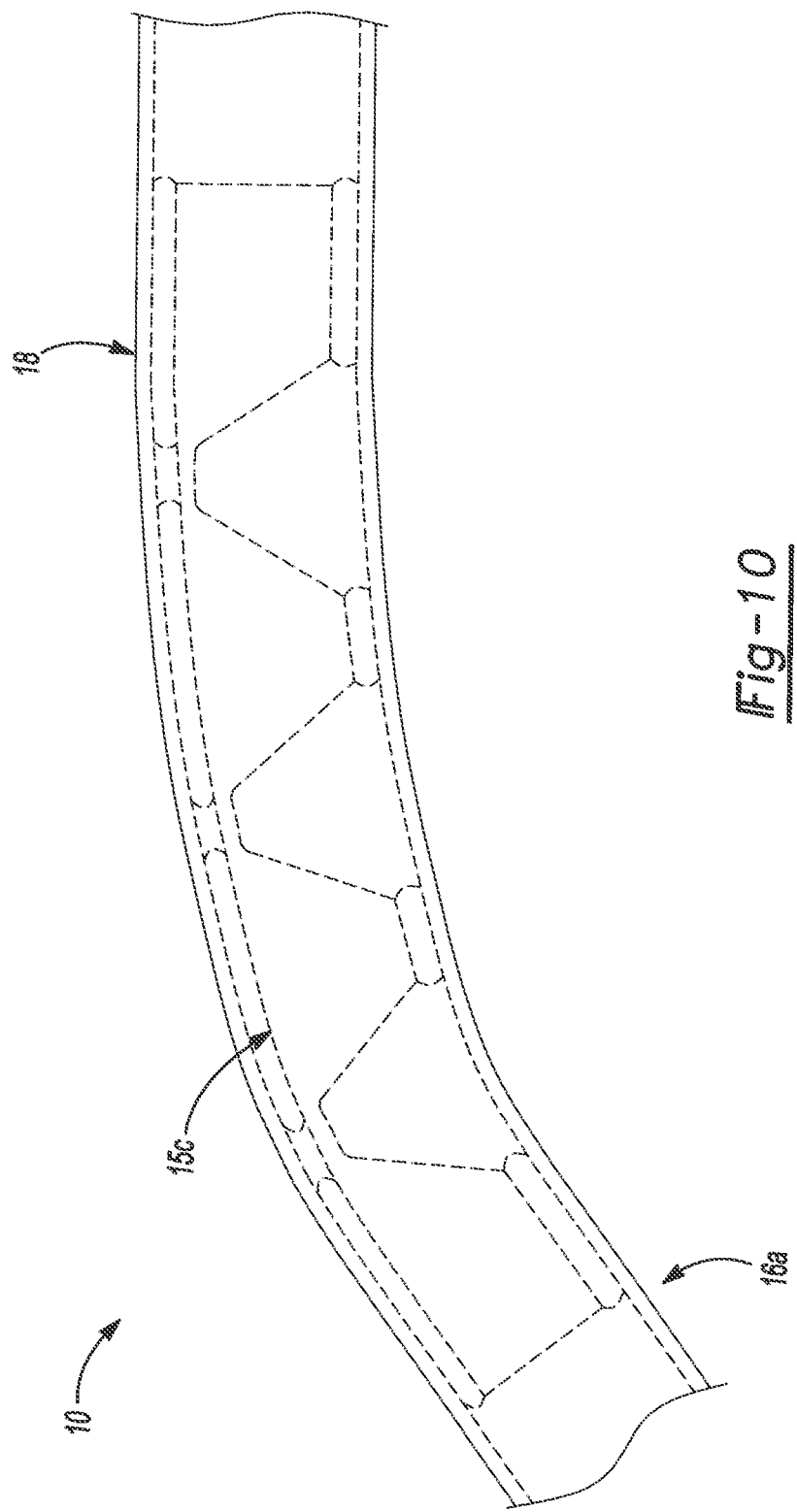

VEHICLE HAVING REINFORCEMENT ASSEMBLIES

FIELD

The present disclosure relates to a vehicle having reinforcement assemblies.

BACKGROUND

This section provides background information related to the present disclosure and is not necessarily prior art.

Some vehicles include inserts that are mounted in vehicle cavities to increase the structure and stiffness of the vehicle. Such inserts are inadequate for mounting in vehicle cavities having curved walls or corners. The present disclosure provides reinforcement assemblies that are adequate for mounting in vehicle cavities having curved walls or corners, thereby increasing the structure and stiffness of the vehicle.

SUMMARY

This section provides a general summary of the disclosure, and is not a comprehensive disclosure of its full scope or all its features.

In one form, the present disclosure provides a vehicle that includes a vehicle body and a segmented reinforcement assembly. The vehicle body has first inner and outer walls that define a cavity and second inner and outer curved walls that define another cavity. The reinforcement assembly includes a plurality of inserts. One insert of the plurality of inserts is at least partially disposed in the cavity defined by the first inner and outer walls and another insert of the plurality of inserts is at least partially disposed in the another cavity defined by the second inner and outer curved walls.

In some configurations of the vehicle of the above paragraph, the one insert and the another insert of the plurality of inserts are independently rotatably attached to each other via a hinge.

In some configurations of the vehicle of any one or more of the above paragraphs, one of a pillar and a roof rail of the vehicle body includes the first inner and outer walls and the other of the pillar and the roof rail of the vehicle body includes the second inner and outer curved walls.

In some configurations of the vehicle of any one or more of the above paragraphs, the pillar and the roof rail cooperate to partially define a door opening of the vehicle body. The roof rail defining a top of the door opening.

In some configurations of the vehicle of any one or more of the above paragraphs, the first inner and outer walls defining the cavity are straight.

In some configurations of the vehicle of any one or more of the above paragraphs, the one insert and the another insert of the plurality of inserts include a plurality of surfaces. At least one of the plurality of surfaces is angled.

In some configurations of the vehicle of any one or more of the above paragraphs, the plurality of inserts are made of a nylon, polypropylene, metal, or other moldable or stampable material.

In some configurations of the vehicle of any one or more of the above paragraphs, the one insert and the another insert of the plurality of inserts include a plurality of surfaces. At least one surface of the plurality of surfaces is coated with an expandable adhesive.

In some configurations of the vehicle of any one or more of the above paragraphs, a support member of the vehicle body includes the first inner and outer walls defining the cavity and the second inner and outer curved walls defining the another cavity.

In some configurations of the vehicle of any one or more of the above paragraphs, the one insert and the another insert of the plurality of inserts are independently rotatably attached to each other via a hinge.

In some configurations of the vehicle of any one or more of the above paragraphs, the one insert and the another insert include a plurality of surfaces, and wherein at least one surface of the plurality of surfaces is angled.

In some configurations of the vehicle of any one or more of the above paragraphs, the plurality of inserts are made of a nylon, polypropylene, metal, or other moldable or stampable material.

In some configurations of the vehicle of any one or more of the above paragraphs, the support member is made by hydroforming.

In some configurations of the vehicle of any one or more of the above paragraphs, the one insert and the another insert include a plurality of surfaces. The at least one surface of the plurality of surfaces is coated with an expandable adhesive.

In some configurations of the vehicle of any one or more of the above paragraphs, one of a vertical section and a horizontal section of the support member includes the first inner and outer walls. A transition section of the support member includes the second inner and outer curved walls.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The drawings described herein are for illustrative purposes only of selected embodiments and not of all possible implementations, and are not intended to limit the scope of the present disclosure.

FIG. 10 is a close-up view of a portion of the body of the vehicle having an alternate reinforcement assembly disposed therein.

Corresponding reference numerals indicate corresponding parts throughout the several views of the drawings.

DETAILED DESCRIPTION

Example embodiments will now be described more fully with reference to the accompanying drawings.

With reference to FIGS. 1-9, a vehicle body 10 (FIG. 1), such as a pick-up truck, is provided. The vehicle body 10 includes a passenger compartment 12. In some configurations, the vehicle body 10 also includes a cargo bed 14. As will be described in more detail below, segmented and articulated reinforcement assemblies 15a, 15b are disposed within the vehicle body 10 to increase strength and stiffness thereof.

Figure 1:
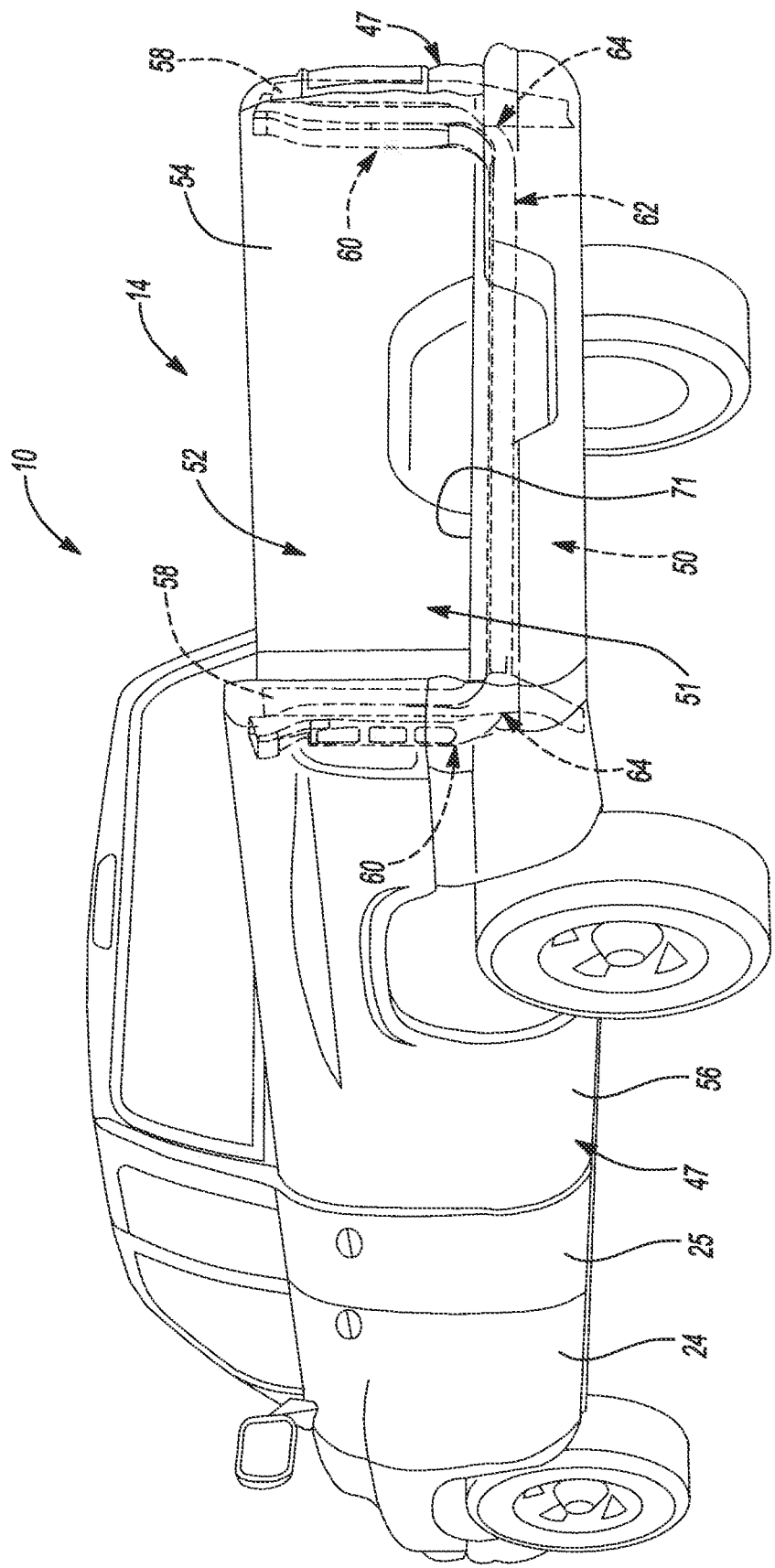
FIG. 1 is a perspective view of a vehicle having reinforcement assemblies disposed therein according to the principles of the present disclosure.
Figure 2:
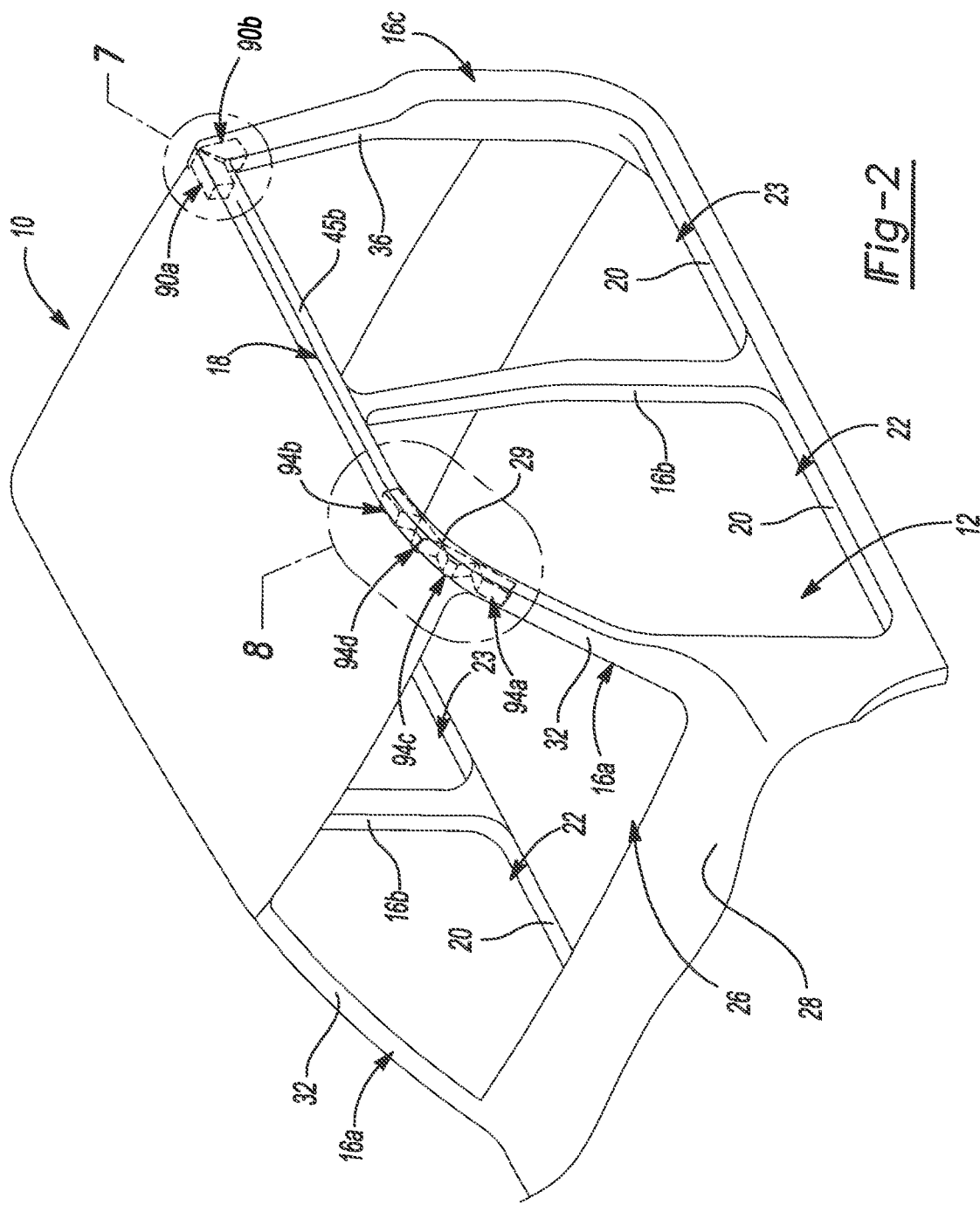
FIG. 2 is a perspective view of a body of the vehicle having the reinforcement assemblies disposed therein.

As shown in FIG. 2, the vehicle body 10 includes a plurality of support members and pillars (e.g., A pillars 16a, B-pillars 16b and C-pillars 16c (only one shown in FIG. 2)), roof rails 18 (only one shown in FIG. 2) and sills 20. The A-Pillars 16a, the B-pillars 16b, the sills 20 and the roof rails 18b cooperate to define door openings 22 in the vehicle body 10 and the B-pillars 16b, the C-pillars 16c, the roof rails 18 and the sills 20 cooperate to define door openings 23 in the vehicle body 10. Doors 24, 25 are rotatably attached to the vehicle body 10 between a closed position (FIG. 1) in which the doors 24, 25 are disposed within the door openings 22, 23, respectively, and an open position (not shown) in which the doors 24, 25 are removed from the door openings 22, 23, respectively.

Figure 7:
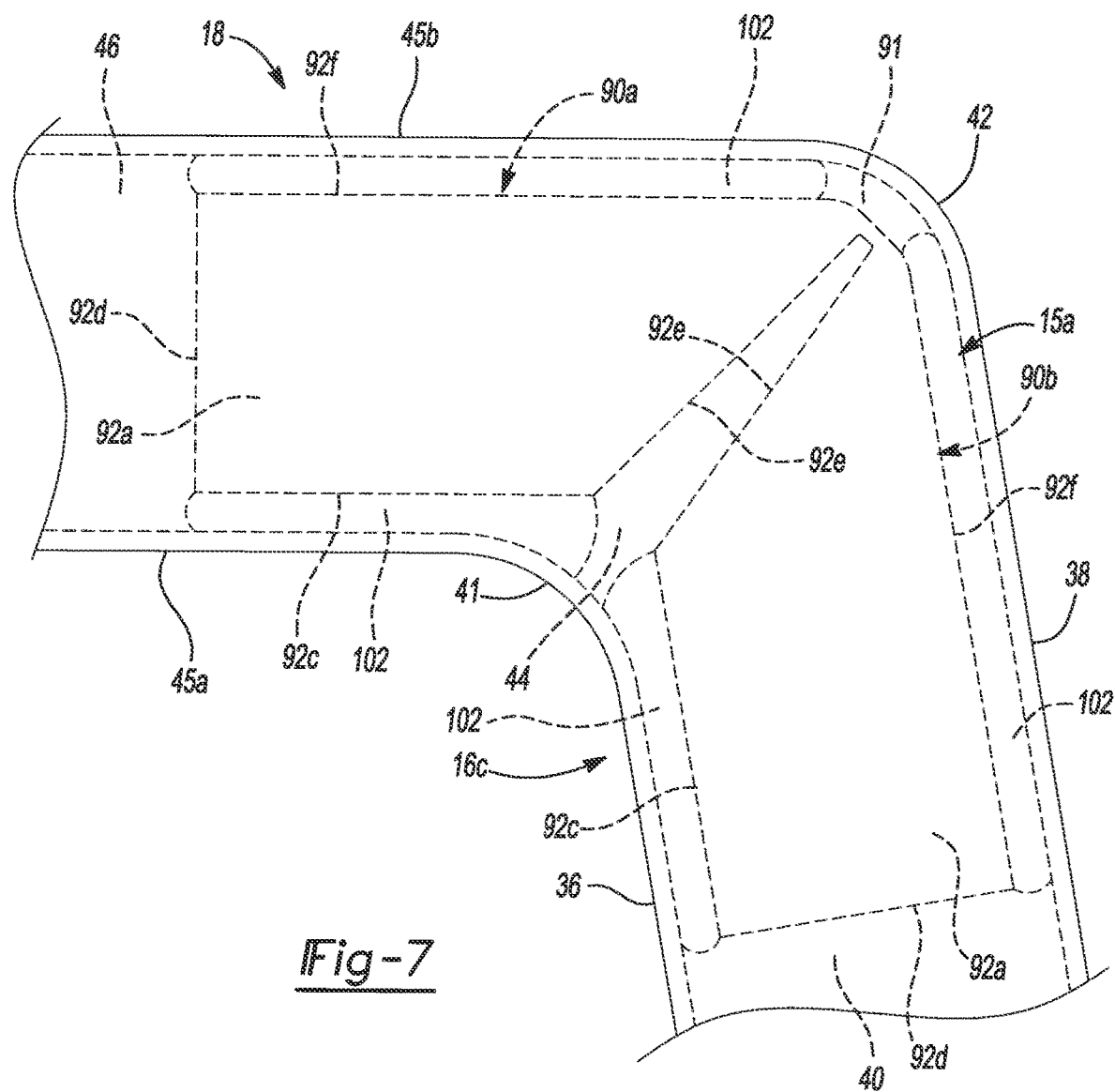
FIG. 7 is a close-up view of a portion of the body of the vehicle indicated as area 7 in FIG. 2.
Figure 8:
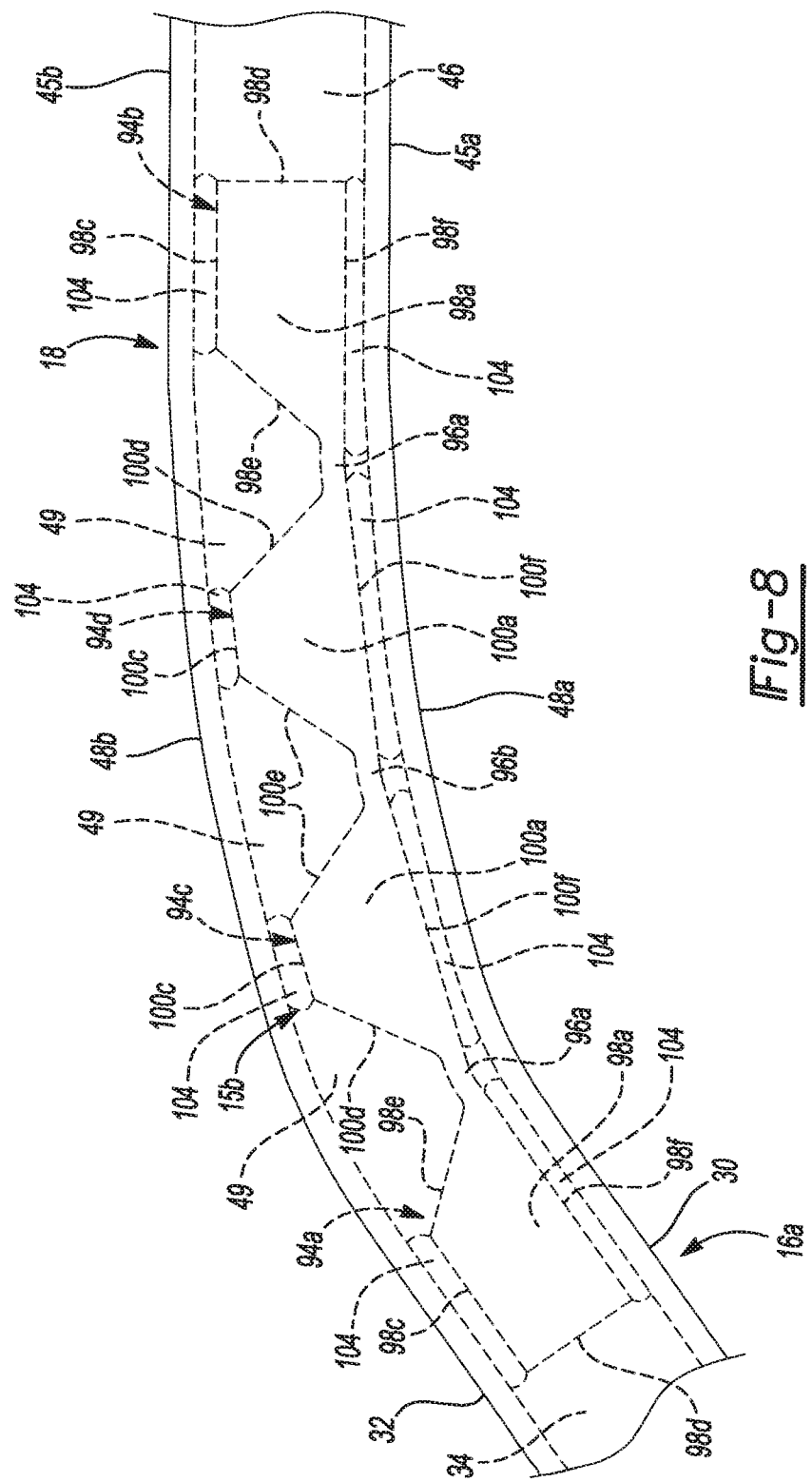
FIG. 8 is a close-up view of a portion of the body of the vehicle indicated as area 8 in FIG. 2.

As shown in FIG. 2, the A-pillars 16a define lateral sides of a window shield opening 26 in the vehicle body 10 and extend from a front end 28 of the vehicle body 10 to a front end 29 of the roof rails 18. As shown in FIG. 8, each A-pillar 16a includes a straight inner wall 30 and a straight outer wall 32 that define a cavity 34 therebetween. With reference to FIGS. 2 and 7, the C-pillars 16c (only one shown in FIG. 2) extend upwardly from a rear end of the sills 20 to a rear end of the roof rails 18. Each C-pillar 16c includes a straight inner wall 36 and a straight outer wall 38 that define a cavity 40 therebetween, and a curved inner wall 41 and a curved outer wall 42 that define a cavity 44 therebetween. Each B-pillar 16b extends from an intermediate portion of a respective sill 20 to a respective roof rail 18. Each roof rail 18 defines a top of the door openings 22, 23. Each roof rail 18 also includes a straight inner wall 45a and a straight outer wall 45b that define a cavity 46 therebetween, and a curved inner wall 48a and a curved outer wall 48b that define a cavity 49 therebetween. The sills 20 define a bottom of the door openings 22, 23.

As shown in FIG. 1, the cargo bed 14 includes sidewalls 47 and a tubular-shaped support member 50. The sidewalls 47 extend between fore and aft ends of the cargo bed 14 and define an opening 51 to a cargo area 52 of the cargo bed 14. The sidewalls 47 also define a lateral periphery of the cargo bed 14. Each sidewall 47 includes inner and outer panels 54, 56 that define a cavity (not shown) therebetween. The support member 50 may be made of a metallic material and formed by a hydroforming process. The support member 50 is tubular-shaped and is at least partially disposed within the cavity (not shown) defined by the inner and outer panels 54, 56 of the sidewalls 47. The support member 50 is also attached to the inner panels 54 of the sidewalls 47 via mounting brackets 58. In some configurations, the support member 50 can be attached to the outer panels 56 of the sidewalls 47 via the mounting brackets 58. The support member 50 includes vertical sections 60, a horizontal section 62 and transition sections 64 that cooperate to define a U-shape.

Figure 9:
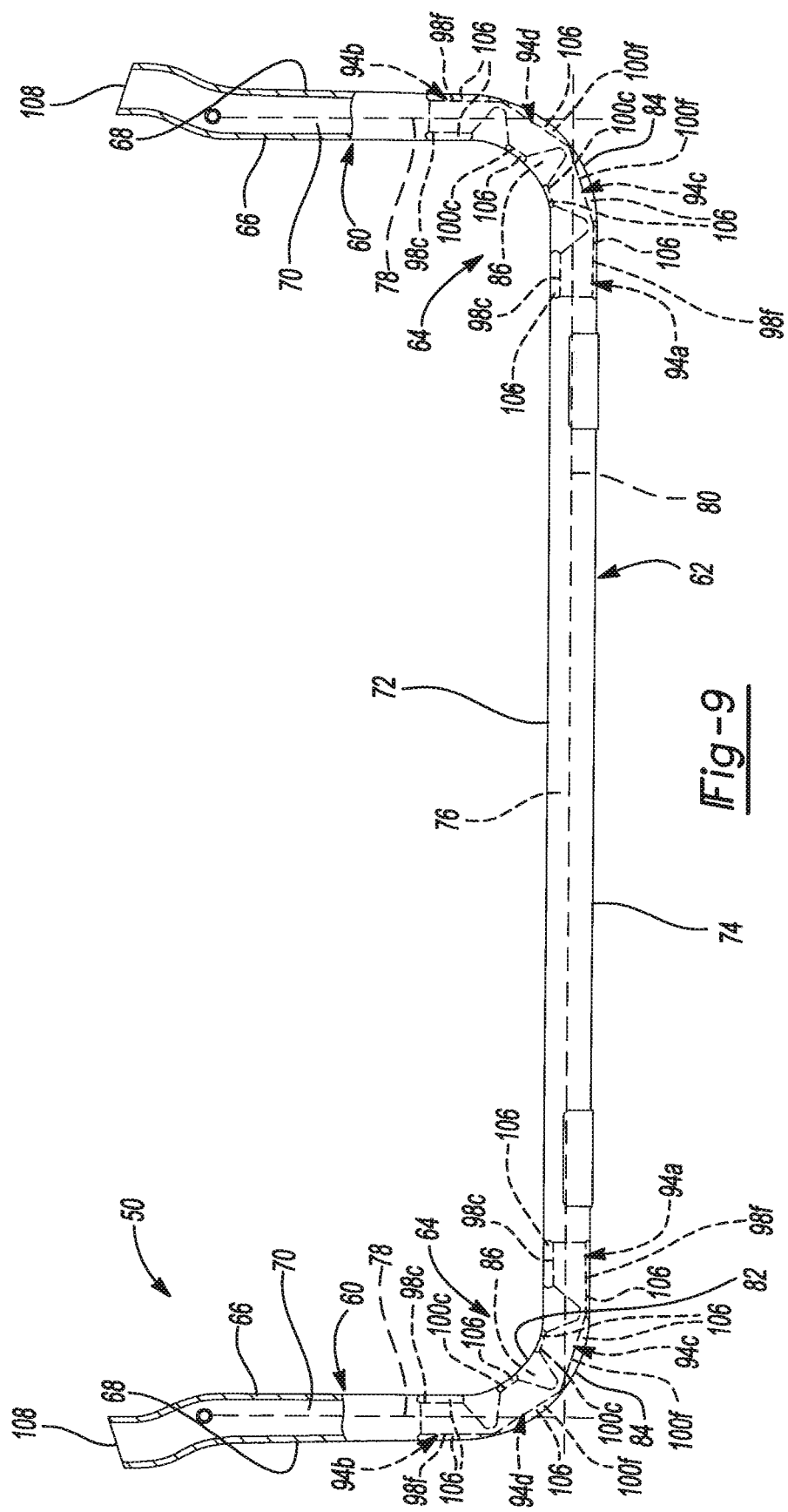
FIG. 9 is a front view of a support member of the vehicle having a reinforcement assembly disposed therein.

With reference to FIGS. 1 and 9, each vertical section 60 is mounted to a respective inner panel 54 of the sidewalls 47 via a respective mounting bracket 58 (FIG. 1). Each vertical section 60 also extends from an end of a respective transition section 64 and includes an inner wall 66 and an outer wall 68 that define a cavity 70 therebetween. At least a portion of the inner and outer walls 66, 68 are straight. The horizontal section 62 extends below a bottom surface 71 of the cargo area 52 and includes a straight inner wall 72 and a straight outer wall 74 that define a cavity 76 therebetween. Each vertical section 60 includes a longitudinal axis 78 that intersects with a longitudinal axis 80 of the horizontal section 62 at a 90 degree angle. Each transition section 64 has inner and outer curved walls 82, 84 that define a cavity 86 therebetween. The cavities 70 of the vertical sections 60, the cavity 76 of the horizontal section 62 and the cavities 86 of the transition sections 64 are in communication with each other.

Figure 3:
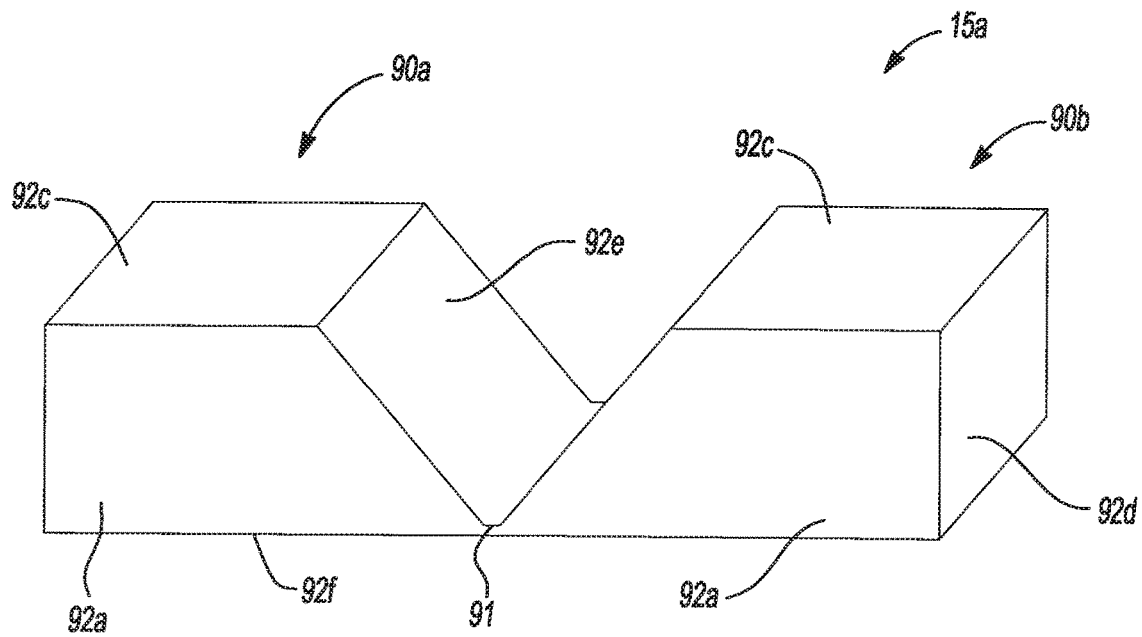
FIG. 3 is a perspective view of a reinforcement assembly of the reinforcement assemblies.
Figure 4:
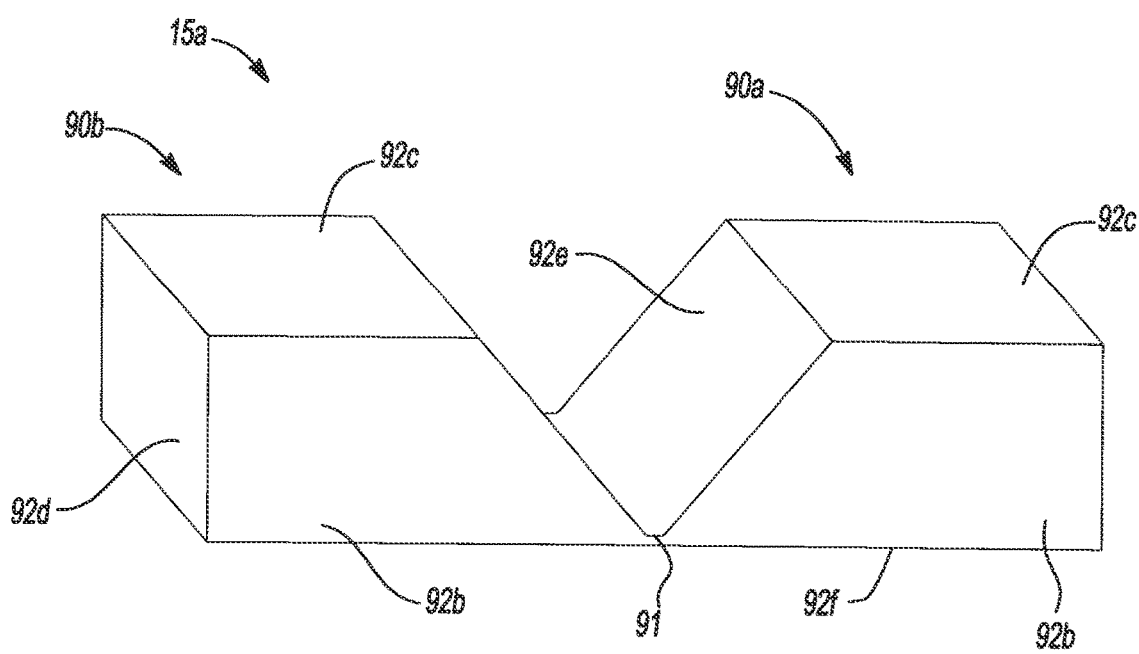
FIG. 4 is another perspective view of the reinforcement assembly.

As shown in FIGS. 3 and 4, each reinforcement assembly 15a includes a plurality of inserts 90a, 90b. The plurality of inserts 90a, 90b are hingedly attached to each other via a hinge 91 such that each insert 90a, 90b is independently rotatable relative to each other. Each insert 90a, 90b is made of a metallic, polypropylene or nylon material, for example, and includes a plurality of sides 92a, 92b, 92c, 92d, 92e, 92f. The trapezoidal-shaped sides 92a, 92b extend parallel to each other and extend perpendicular to rectangular-shaped sides 92c, 92d. The sides 92c, 92d also extend perpendicular to each other. The rectangular-shaped side 92e extends downwardly from the side 92c toward the hinge 91. The side 92e is also angled 45 degrees, for example, from the side 92f. The sides 92e of the inserts 90a, 90b also face each other.

Figure 5:
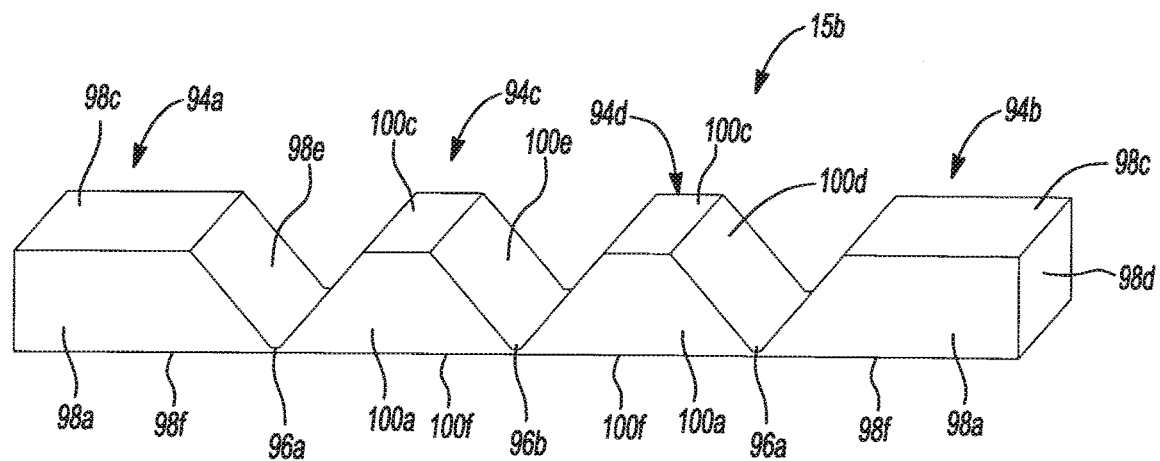
FIG. 5 is a perspective view of another reinforcement assembly of the reinforcement assemblies.
Figure 6:
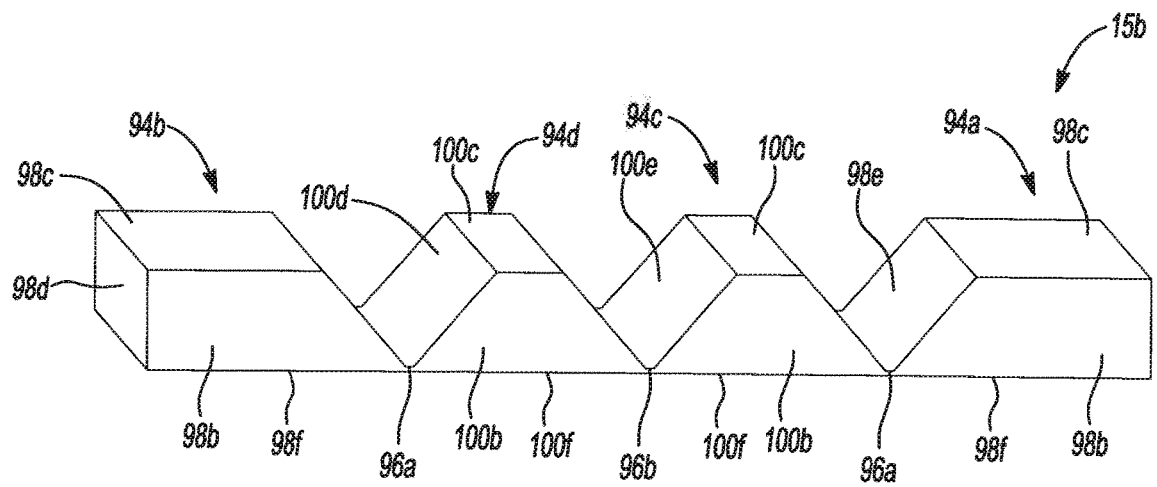
FIG. 6 is another perspective view of the another reinforcement assembly.

As shown in FIGS. 5 and 6, each reinforcement assembly 15b includes a plurality of inserts 94a. 94b, 94c, 94d. The inserts 94a, 94b are hingedly attached to a respective insert 94c, 94d via a hinge 96a such that the inserts 94a, 94b are independently rotatable relative to each other and the inserts 94c, 94d. The inserts 94a, 94b are made of a metallic, polypropylene or nylon material, for example, and includes a plurality of sides 98a, 98b, 98c, 98d, 98e, 98f. The trapezoidal-shaped sides 98a, 98b extend parallel to each other and extend perpendicular to rectangular-shaped sides 98c, 98d. The sides 98c, 98d also extend perpendicular to each other. The rectangular-shaped side 98e extends downwardly from the side 98c toward the hinge 96a. The side 98e is also angled 45 degrees, for example, from the side 98f.

The inserts 94c, 94d are disposed between the inserts 94a, 94b. In some configurations, the inserts 94a, 94b and the inserts 94c, 94d can be arranged in an alternating fashion. The insert 94c is hingedly attached to the insert 94a at one end via the hinge 96a and hingedly attached to the insert 94d at another end via a hinge 96b. In this manner, the insert 94c is independently rotatable relative to the inserts 94a, 94b, 94d. Similarly, the insert 94d is hingedly attached to the insert 94b at one end via the hinge 96a and hingedly attached to the insert 94c at another end via the hinge 96b. In this manner, the insert 94d is independently rotatable relative to the inserts 94a, 94b, 94c. The inserts 94c, 94d are made of a metallic, polypropylene or nylon material, for example, and includes a plurality of sides 100a, 100b, 100c, 100d, 100e, 100f. The trapezoidal-shaped sides 100a, 100b extend parallel to each other and extend perpendicular to rectangular-shaped side 100c. The rectangular-shaped side 100d extends downwardly from the side 100c toward the hinge 96a. Similarly, the rectangular-shaped side 100e extends downwardly from the side 100c toward the hinge 96b. The sides 100d, 100e are also angled 45 degrees, for example, from the side 100f. The sides 100d of the inserts 94c, 94d face the sides 98e of the inserts 94a, 94b and the sides 100e of the inserts 94c, 94d face each other.

With continued reference to FIGS. 1-9, installation of the reinforcement assemblies 15a, 15b within the vehicle body 10 will be described in detail. As shown in FIGS. 2 and 7, one of the reinforcement assemblies 15a is disposed in the vehicle body 10. That is, the insert 90a of the one of the reinforcement assemblies 15a is at least partially disposed in the cavity 46 defined by the straight walls 45a, 45b and at least partially disposed in the cavity 44 defined by the curved walls 41, 42. The insert 90b is at least partially disposed in the cavity 44 defined by the curved walls 41, 42 and at least partially disposed in the cavity 40 defined by the walls 36, 38. The hinge 91 allows the inserts 90a, 90b to independently rotate, which facilitates positioning of the one of the reinforcement assemblies 15a around the curved walls 41, 42 and within the cavities 40, 44, 46 that are in communication with each other. An adhesive 102 (e.g., epoxy) is coated on sides 92a, 92b, 92c, 92f of the inserts 90a, 90b such that the one of the reinforcement assemblies 15a is fixed into position once the vehicle body 10 is heated (e.g., during paint baking of the vehicle body 10). That is, the adhesive 102 expands (FIG. 7) as the vehicle body 10 is heated so as to bond to inside surfaces 103 of the walls 36, 38 of the C-pillar 16c and inside surfaces 105 of the walls 45a, 45b of the respective roof rail 18. In this way, the one of the reinforcement assemblies 15a is fixed into position within the vehicle body 10.

As shown in FIGS. 2 and 8, one reinforcement assembly 15b is disposed in the vehicle body 10. That is, the insert 94a of the one reinforcement assembly 15b is at least partially disposed in the cavity 34 defined by the straight walls 30, 32 and the insert 94b is at least partially disposed in the cavity 46 defined by the walls 45a, 45b. The inserts 94c, 94d are at least partially disposed in the cavity 49 defined by the curved walls 48a, 48b. The hinges 96a, 96b allow the inserts 94a, 94b, 94c, 94d to independently rotate, which facilitates positioning of the one reinforcement assembly 15b around the curved walls 48a, 48b and within the cavities 34, 46, 49 that are in communication with each other. An adhesive 104 (e.g., epoxy) is coated on sides 98a, 98b, 98c, 98f of the inserts 94a, 94b and sides 100a, 100b, 100c, 100f of the inserts 94c, 94d such that the one reinforcement assembly 15b is fixed into position once the vehicle body 10 is heated (e.g., during paint baking of the vehicle body 10). That is, the adhesive 104 expands (FIG. 8) as the vehicle body 10 is heated so as to bond to inside surfaces 107 of the walls 30, 32, inside surfaces 109 of the walls 48a, 48b and the inside surfaces 105 of the walls 45a, 45b. In this way, the one reinforcement assembly 15b is fixed into position within the vehicle body 10.

As shown in FIG. 9, two reinforcement assemblies 15b are disposed in the support member 50 of the cargo bed 14. That is, each of the two reinforcement assemblies 15b is inserted into an opening 108 of a respective vertical section 60 such that the insert 94a is at least partially disposed in the cavity 76 of the horizontal section 62, the inserts 94c, 94d are at least partially disposed in the cavity 86 of the transition section 64 and the insert 94b is at least partially disposed in the cavity 70 of the vertical section 60. The hinges 96a, 96b allow the inserts 94a, 94b, 94c, 94d to independently rotate, which facilitates positioning of the inserts 94a, 94b, 94c, 94d around the curved walls 82, 84 of the transition section 64 as each of the two reinforcement assemblies 15b is inserted in the support member 50. An adhesive 106 (e.g., epoxy) is coated on sides 98a, 98b, 98c, 98f of the inserts 94a, 94b and sides 100a, 100b, 100c, 100f of the inserts 94c, 94d such that each of the two reinforcement assemblies 15b is fixed into position once the cargo bed 14 is heated (e.g., during paint baking of the vehicle body 10). That is, the adhesive 106 expands as the cargo bed 14 is heated so as to bond to the support member 50. In this way, each of the two reinforcement assemblies 15b is fixed into position within the support member 50.

In some configurations, the angle of the sides 100d, 100e of the inserts 94c, 94d can be 85 degrees, for example, from the side 100f and coated with an adhesive, and the angle of the side 98e of the inserts 94a, 94b can be 85 degrees, for example, from the side 100f and coated with an adhesive. In this way, when the reinforcement assemblies 15b are disposed in cavities of the vehicle body 10, the adhesive on the sides 100d, 100e and the adhesive on the side 98e will expand such that the inserts 94a, 94b, 94c, 94d bond to each other as well as to the vehicle body 10 once the vehicle body 10 is heated.

One of the benefits of the present disclosure is that the reinforcement assemblies 15a, 15b are able to articulate and move around curved walls or corners of closed cavities.

With reference to FIG. 10, another reinforcement assembly 15c is provided. The structure and function of the reinforcement assembly 15c can be similar or identical to that of reinforcement assemblies 15a, 15b described above, apart from any exception described below. The reinforcement assembly 15c is disposed in the A-pillar 16a and the roof rail 18 of the vehicle body 10 as shown in FIG. 10 to better fill the cavity of the vehicle body 10.

What is claimed is:
1. A vehicle comprising:
a vehicle body including first inner and outer walls defining a first cavity that extends in a first direction, second inner and outer walls defining a second cavity that extends in a second direction different from the first direction, and third inner and outer curved walls defining a third cavity that interconnects the first cavity and the second cavity; and
a segmented reinforcement assembly including at least a first insert and a second insert attached to each other by a hinge that permits the first insert to move relative to the second insert,
wherein the segmented reinforcement assembly is a monolithic member where the first insert, the second insert, and the hinge are each formed of the same material, and
wherein the first insert of the plurality of inserts is partially disposed in each of the first cavity defined by the first inner and outer walls and the third cavity defined by the third inner and outer curved walls, and the second insert of the plurality of inserts is partially disposed in the second cavity defined by the second inner and outer walls and the third cavity defined by the third inner and outer curved walls.
2. The vehicle of claim 1, wherein one of a pillar and a roof rail of the vehicle body includes the first inner and outer walls and the other of the pillar and the roof rail of the vehicle body includes the second inner and outer walls, and the pillar and roof rail are interconnected by the third inner and outer curved walls.

3. The vehicle of claim 2, wherein the pillar and the roof rail cooperate to partially define a door opening of the vehicle body, the roof rail defining a top of the door opening.

4. The vehicle of claim 1, wherein the first inner and outer walls defining the cavity are straight.

5. The vehicle of claim 1, wherein the first and second inserts include a plurality of surfaces, and wherein at least one of the plurality of surfaces is angled.

6. The vehicle of claim 1, wherein the segmented reinforcement assembly is made of a nylon material.

7. The vehicle of claim 1, wherein the first insert and the second insert of the plurality of inserts include a plurality of surfaces, and wherein at least one surface of the plurality of surfaces is coated with an expandable adhesive.

8. The vehicle of claim 1, wherein a support member of the vehicle body includes the first inner and outer walls defining the cavity, the second inner and outer walls defining the second cavity, and the third inner and outer curved walls defining the third cavity.

9. The vehicle of claim 8, wherein the first insert and the second insert include a plurality of surfaces, and wherein at least one surface of the plurality of surfaces is angled.

10. The vehicle of claim 8, wherein the segmented reinforcement assembly is made of a nylon material.

11. The vehicle of claim 8, wherein the support member is made by hydroforming.

12. The vehicle of claim 8, wherein the first insert and the second insert include a plurality of surfaces, and wherein at least one surface of the plurality of surfaces is coated with an expandable adhesive.

13. The vehicle of claim 8, wherein a vertical section of the support member includes the first inner and outer walls, a horizontal section of the support member includes the second inner and outer walls, and and a transition section of the support member interconnecting the vertical section to the horizontal section includes the third inner and outer curved walls.

14. The vehicle of claim 1, wherein the first direction and the second direction are arranged substantially orthogonal to each other.

* * * * *